US012600678B2

(12) United States Patent
Kubota et al.

(10) Patent No.: US 12,600,678 B2
(45) Date of Patent: Apr. 14, 2026

(54) METHOD FOR CHARGING OPEN PORES IN CERAMIC MATRIX COMPOSITE, AND CERAMIC MATRIX COMPOSITE

(71) Applicants: IHI Aerospace Co., Ltd., Gunma (JP); Japan Aerospace Exploration Agency, Chofu (JP)

(72) Inventors: Yuki Kubota, Tokyo (JP); Michimasa Uda, Tokyo (JP); Haruhiko Soeda, Tokyo (JP); Takuya Aoki, Chofu (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 295 days.

(21) Appl. No.: 18/038,311

(22) PCT Filed: Dec. 3, 2021

(86) PCT No.: PCT/JP2021/044513
§ 371 (c)(1),
(2) Date: Dec. 4, 2023

(87) PCT Pub. No.: WO2022/118962
PCT Pub. Date: Jun. 9, 2022

(65) Prior Publication Data
US 2024/0116824 A1 Apr. 11, 2024

(30) Foreign Application Priority Data
Dec. 4, 2020 (JP) ................................. 2020-201594

(51) Int. Cl.
*C04B 35/80* (2006.01)
*C04B 35/628* (2006.01)
(52) U.S. Cl.
CPC ........ *C04B 35/80* (2013.01); *C04B 35/62849* (2013.01); *C04B 35/62852* (2013.01);
(Continued)

(58) Field of Classification Search
CPC .......................... C04B 35/80; C04B 35/62849
See application file for complete search history.

(56) References Cited

U.S. PATENT DOCUMENTS

| 2004/0022956 A1 | 2/2004 | Patrick et al. | |
| 2010/0156005 A1* | 6/2010 | Chang ................... | H05B 6/362 |
| | | | 264/413 |

(Continued)

FOREIGN PATENT DOCUMENTS

| CN | 102795871 A | 11/2012 |
| CN | 103304249 A * | 9/2013 |

(Continued)

OTHER PUBLICATIONS

Yamauchi, Hiroshi et al., "Development of low-cost C/C/ and CMC using a film-boiling process", Journal of IHI Technologies, 2017, pp. 53-67, vol. 57 No. 2.

(Continued)

*Primary Examiner* — Robert A Vetere
(74) *Attorney, Agent, or Firm* — Volpe Koenig

(57) ABSTRACT

Provided is a method for charging, with ceramic, open pores formed in a matrix of a ceramic matrix composite that includes the matrix and reinforcing fibers provided in the matrix. The ceramic comes to constitute the matrix. The method includes repeating the following steps (A) and (B) in a state where the ceramic matrix composite is arranged in a liquid material serving as a matrix material. At the step (A), the ceramic matrix composite is heated such that the liquid material is brought into a film-boiling state, and the ceramic derived from the liquid material is thereby generated in the open pores. At the step (B), the ceramic matrix composite is cooled until a temperature of the ceramic matrix composite becomes lower than a boiling point of the liquid material.

7 Claims, 8 Drawing Sheets

(52) U.S. Cl.
CPC .. *C04B 35/62855* (2013.01); *C04B 35/62863* (2013.01); *C04B 35/62868* (2013.01); *C04B 35/62873* (2013.01); *C04B 35/62886* (2013.01); *C04B 2235/3217* (2013.01); *C04B 2235/3244* (2013.01); *C04B 2235/3418* (2013.01); *C04B 2235/3481* (2013.01); *C04B 2235/3826* (2013.01); *C04B 2235/386* (2013.01); *C04B 2235/422* (2013.01); *C04B 2235/483* (2013.01); *C04B 2235/486* (2013.01); *C04B 2235/5244* (2013.01); *C04B 2235/616* (2013.01)

(56) References Cited

U.S. PATENT DOCUMENTS

| 2010/0272923 A1 | 10/2010 | Fillion | |
| 2020/0031722 A1 * | 1/2020 | Uda | C23C 16/325 |

FOREIGN PATENT DOCUMENTS

| JP | H11-343176 A | 12/1999 | |
| JP | 2004-513053 A | 4/2004 | |
| JP | 2010-255174 A | 11/2010 | |
| WO | WO-2018168400 A1 * | 9/2018 | C04B 35/80 |

OTHER PUBLICATIONS

Besnard, C. et al., "Synthesis of hexacelsian barium aluminosilicate by film boiling chemical vapour process", Journal of the European Ceramic Society 40 (2020), Oct. 9, 2019, pp. 3494-3497, Elsevier Ltd.

Shimizu, M. et al., "Crystalization Behavior and Change in Surface Area of Alkoxide-Derived Mullite Precursor Powders with Different Compositions", Journal of the Ceramic Society of Japan 105, 1997, pp. 131-135.

Mei, Min et al., "Preparation of C/SiC composites by pulse chemical liquid-vapor deposition process", Materials Letters 82, 2012, pp. 36-38, Elsevier Ltd.

International Preliminary Report on Patentability issued on Jun. 15, 2023 for PCT International Application No. PCT/JP2021/044513.

Extended European Search Report issued on Apr. 24, 2024 for European Patent Application No. 21900711.9.

Qinchuan, H., et al., "Microstructure, mechanical and anti-ablation properties of SiCnw/PcY core-shell networks reinforced C/C—ZrC—SiC composites fabricated by a multistep method of chemical liquid-vapor deposition", Article, Ceramics International, (2018).

Deng, H., "Densification behavior and microstructure of carbon/carbon composites prepared by chemical vapor infiltration from xylene at temperatures between 900 and 1250° C.", Northwestern Polytechnical University, China (2011).

Japanese Office Action issued on Sep. 6, 2024 for Japanese Patent Application No. 2020-201594.

Yamauchi, H., et al., "Development of Low Cost C/C and CMC using a Film-Boiling Process", (2021).

* cited by examiner

1 μm

REINFORCING FIBER

METHOD FOR CHARGING OPEN PORES IN CERAMIC MATRIX COMPOSITE, AND CERAMIC MATRIX COMPOSITE

TECHNICAL FIELD

The present invention relates to a technique of charging, with ceramic, open pores formed in a matrix of a ceramic matrix composite.

BACKGROUND ART

A ceramic matrix composite is a composite that includes ceramic as a matrix, and reinforcing fibers provided in the matrix. Examples of the ceramic includes silicon carbide. The ceramic matrix composites are used as high-temperature structural members in rocket engines, aircraft jet engines, and the like.

The matrix is formed on the reinforcing fibers (i.e., a fiber body that is, for example, a woven or knitted fabric of the reinforcing fibers) by a method of chemical vapor impregnation (CVI), polymer impregnation of pyrolysis (PIP), metal melt infiltration (MI), or the like. The fiber body is also called a preform.

In the CVI method, a reactive gas is caused to flow through a heated fiber body, and a reactant consequent on the reactive gas is deposited as a matrix in gaps in the fiber body. In the PIP method, a fiber body is impregnated with a polymer such as polycarbosilane, and the impregnation polymer is burned to form a matrix. In the MI method, a powder material (e.g., powder of silicon carbide or carbon) is made to be contained in an inside of a fiber body, and then, a melted metal component (e.g., metallic silicon) is caused to flow into the fiber body so that a matrix (e.g., the matrix of silicon carbide and metallic silicon) is formed.

In the course of such a matrix-forming treatment, small open pores such as cracks tend to be formed in the matrix. The open pores are ones (hereinafter, simply referred to also as open pores) that are open to an outside. Conventionally, the matrix-forming treatment is performed repeatedly or over a long time, in order to charge such open pores with a matrix material.

For example, according to Patent Literature 1, a dense matrix with a small number of open pores is formed by performing polymer impregnation of pyrolysis twice, and performing chemical vapor impregnation. According to Patent Literature 2 and Non-Patent Literature 3, a carbon-fiber preform is immersed in a low-molecular-weight liquid polycarbosilane as a precursor liquid, and pulse heating is repeated in order to increase denseness of the matrix.

CITATION LIST

Patent Literatures

Patent Literature 1: JP1999-343176A
Patent Literature 2: CN102795871A

Non-Patent Literatures

Non-Patent Literature 1: C. Besnarda et al. [Synthesis of hexacelsian barium aluminosilicate by film boiling chemical vapour process], Journal of the European Ceramic Society 40 (2020) 3494-3497
Non-Patent Literature 2: Masanori SHIMIZU et al. [Crystallization Behavior and Change in Surface Area of Alkoxide-Derived Mullite Precursor Powders with Different Compositions], Journal of the Ceramic Society of Japan 105 [2] 131-135 (1997)
Non-Patent Literature 3: Min Mei et al. [Preparation of C/SiC composites by pulse chemical liquid-vapor deposition process], Materials Letters 82 (2012) 36-38

SUMMARY OF INVENTION

Technical Problem

When one open pore is entirely or partially elongated, and has a narrow width equal to or smaller than several micrometers, the following problems (a) and (b) occur in the prior art.

(a) It takes a long time to charge the open pore with ceramic that comes to constitute the matrix.

(b) Conventionally, it has been difficult to charge, with ceramic, a narrow portion having a width equal to or smaller than several micrometers (e.g., a portion having a width within or smaller than a range from 1 μm to 2 μm) in the open pore.

For example, it is difficult for even the techniques of Patent Literature 2 and Non-Patent Literature 3 to prevent an open pore with a width equal to or smaller than several micrometers from remaining in a matrix of a produced ceramic matrix composite.

In view of the above, an object of the present invention is to provide a technique that can solve at least one of the above-described problems. In other words, the object of the present invention is to provide a technique that can achieve one or both of: the matter that open pores formed in a matrix of a ceramic matrix composite can be charged with ceramic in a short time; and the matter that a narrow portion having a width equal to or smaller than several micrometers and constituting at least a part of an open pore formed in a matrix of a ceramic matrix composite can be charged with ceramic.

Solution to Problem

In order to accomplish the above-described object, a method for charging open pores according to the present invention is a method for the open pores in a ceramic matrix composite including a matrix and reinforcing fibers provided in the matrix, the method being for charging, with ceramic, the open pores formed in the matrix of the ceramic matrix composite, so that the ceramic comes to constitute the matrix, wherein the method comprises:

a step (A) of, in a state where the ceramic matrix composite is arranged in a liquid material serving as a matrix material, heating the ceramic matrix composite, thereby bringing the liquid material into a film-boiling state such that the ceramic derived from the liquid material is generated in the open pores; and a step (B) of, in the state, cooling the ceramic matrix composite until a temperature of the ceramic matrix composite becomes a temperature lower than a boiling point of the liquid material, and the method comprises repeating the step (A) and the step (B), thereby charging the open pores with the ceramic.

A ceramic matrix composite according to the present invention is one for which the above-described method for charging the open pores has been performed so that the open pores of the ceramic matrix composite are charged with the ceramic.

Advantageous Effects of Invention

According to the present invention, it is possible to achieve one or both of: the matter that open pores formed in a matrix of a ceramic matrix composite can be charged with ceramic in a short time; and the matter that an open pore formed in a matrix of a ceramic matrix composite can be charged with ceramic even when the open pore has a size (e.g., a width) equal to or smaller than several micrometers.

DESCRIPTION OF EMBODIMENTS

The following describes embodiments of the present invention with reference to the drawings. The same reference sign is allocated to each of the corresponding parts in the respective drawings, and duplicate description is omitted.

First Embodiment

A method according to a first embodiment of the present invention is a method for charging open pores in a ceramic matrix composite. The method is performed for charging, with ceramic, the open pores existing in a matrix of the ceramic matrix composite. The ceramic matrix composite includes the matrix, and a large number of reinforcing fibers that are provided as reinforcing members in the matrix. The ceramic matrix composite may be one used as a high-temperature structural member in a rocket engine, an aircraft jet engine, or the like.

The ceramic matrix composite as a target of the method for charging the open pores according to the present embodiment may be one that has been formed by treatment of forming a matrix on a large number of reinforcing fibers. This treatment may be a treatment that uses the above-described CVI, PIP, or MI, or may be a treatment that uses the below-described film boiling. The matrix may be formed of silicon carbide, but may be formed of any (e.g., mullite) of other materials.

Each of the reinforcing fibers may be a fiber whose main component is silicon carbide or carbon. For example, the reinforcing fibers are silicon carbide fibers or carbon fibers.

However, according to the present invention, the reinforcing fibers are not limited to these, and may be heat-resistant oxide fibers such as alumina fibers, mullite fibers, or zirconia fibers. A large number of the reinforcing fibers may be provided, in the matrix, as the fiber body formed of a large number of the reinforcing fibers. The fiber body may be a woven or knitted fabric of the reinforcing fibers.

Figure 1:
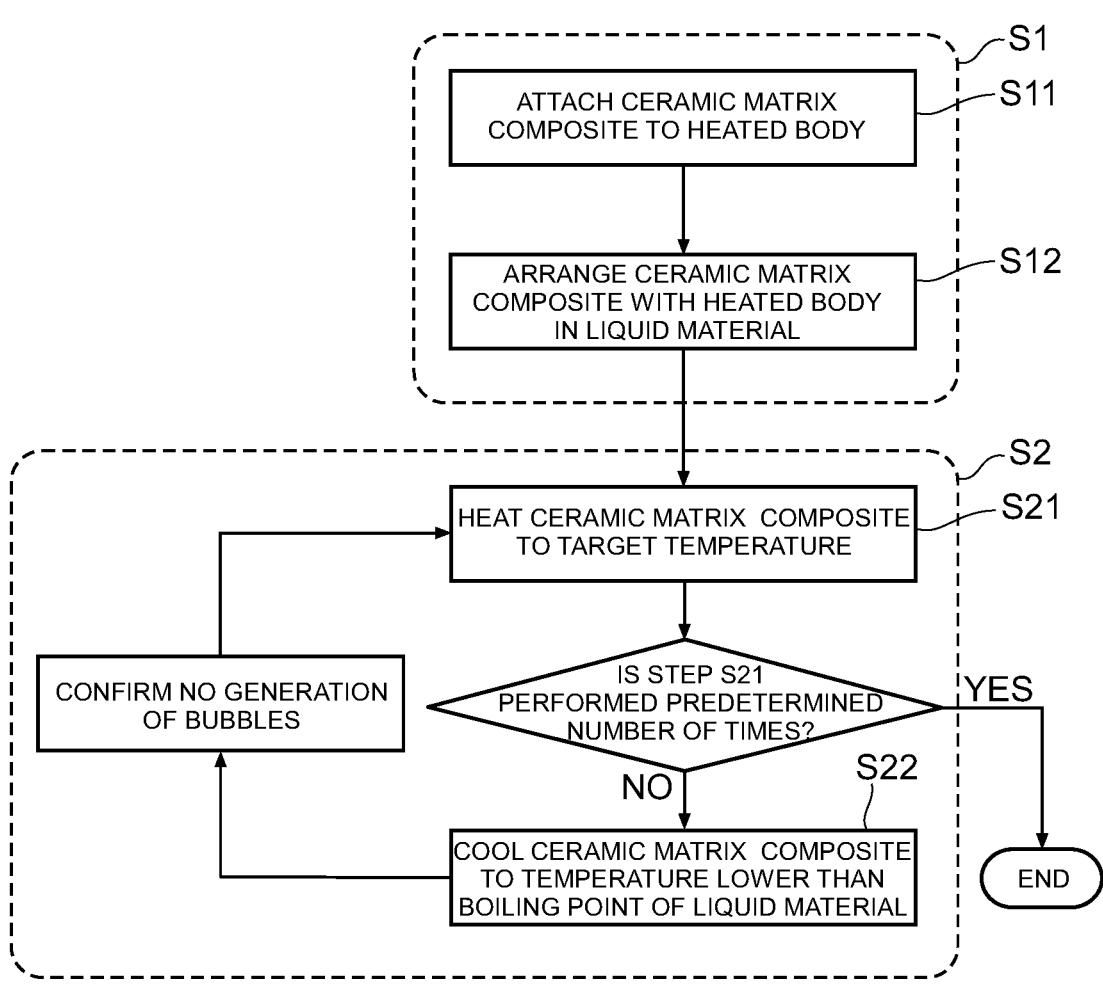
FIG. 1 is a flowchart representing a method for charging, with ceramic, open pores in a ceramic matrix composite according to a first embodiment of the present invention.

FIG. 1 is a flowchart representing the method according to the first embodiment of the present invention. The method is performed for charging, with ceramic, the open pores of the ceramic matrix composite.

At a step S1, the target ceramic matrix composite is arranged in a liquid material. The ceramic matrix composite may be an already-produced ceramic matrix composite. The liquid material used at the step S1 is liquid, and is the below-described material for ceramic to be generated in the open pores in the matrix of the ceramic matrix composite.

The step S1 includes steps S11 and S12. At the step S11, the ceramic matrix composite is attached to a heated body by an attachment tool. Thereby, the ceramic matrix composite is integrally coupled to the heated body and the attachment tool. The number of the ceramic matrix composites thus attached to the heated body may be one or plural (two in the example of FIG. 2A described below). In a state where the ceramic matrix composite is attached to the heated body by the attachment tool, the ceramic matrix composite may be in contact with or in non-contact with the heated body.

Figure 2A:
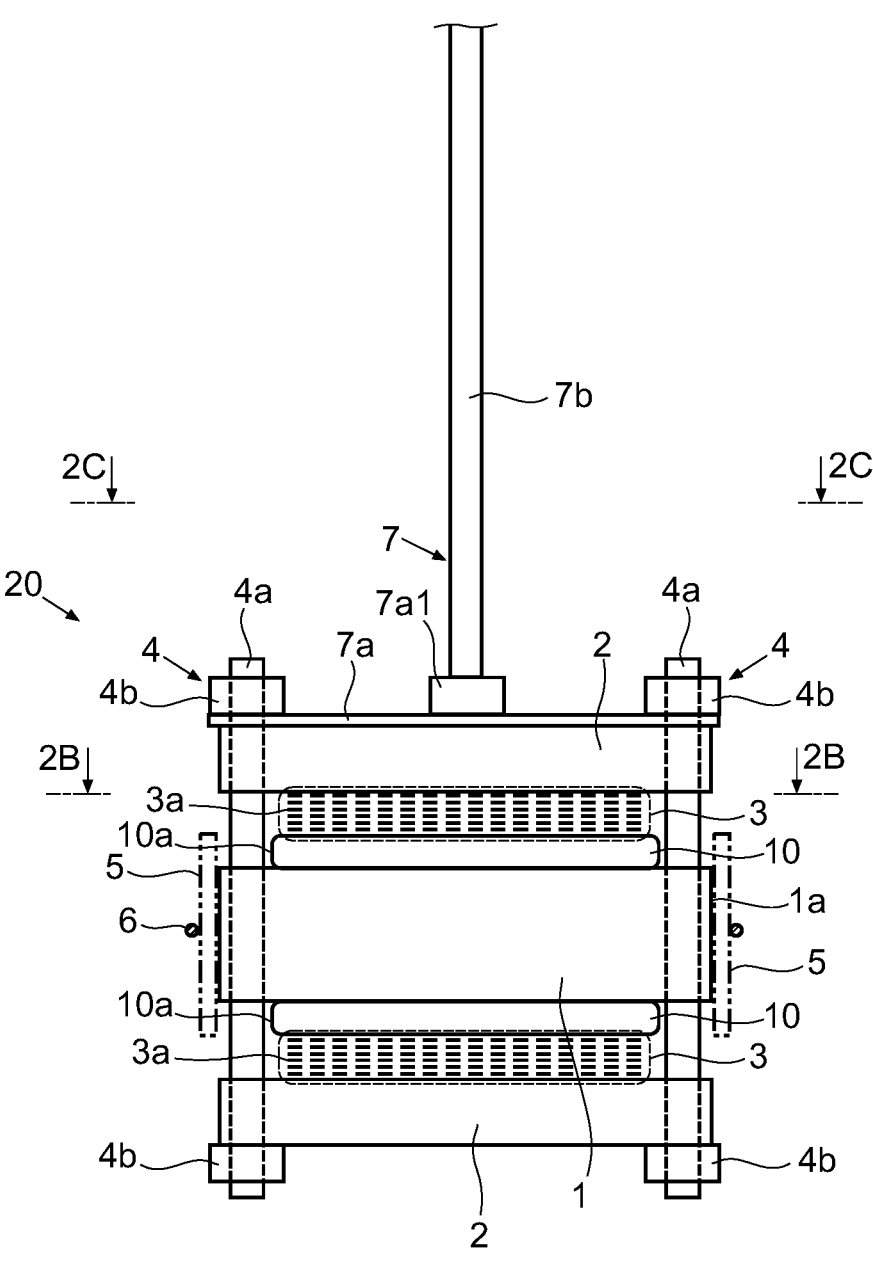
FIG. 2A illustrates one example of an attachment tool used for attaching the ceramic matrix composite to a heated body.

FIG. 2A illustrates one example of the attachment tool that can be used at the step S11. However, the attachment tool is not limited to the configuration example in FIG. 2A, and may be any attachment tool that maintains the state in which the ceramic matrix composite is attached to the heated body.

Figure 2B:
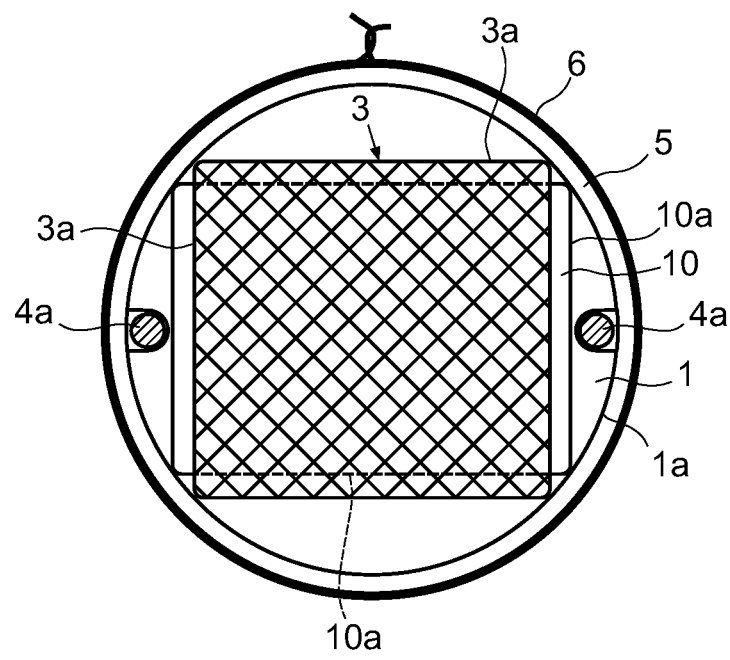
FIG. 2B is an arrow view taken along the line 2B-2B in FIG. 2A.

In the case of FIG. 2A, at the step S11, the ceramic matrix composite is attached to the heated body by the attachment tool 20. FIG. 2B is an arrow view taken along the line 2B-2B in FIG. 2A. FIG. 2A illustrates the state (hereinafter, simply referred to also as an attached state) where the two ceramic matrix composites 10 are attached to the heated body 1 by the attachment tool 20. In the example of FIG. 2A, each of the ceramic matrix composites 10 in the attached state is in contact with the heated body 1. The attachment tool 20 includes a pair of heat insulating plates 2, porous bodies 3, an acting mechanism 4, a heat insulating member 5, and a suspension unit 7.

The heated body 1 is formed of a material (e.g., graphite) that can be induction-heated. The heated body 1 is arranged between a pair of the heat insulating plates 2. The heat insulating plates 2 are each formed of a material (e.g., alumina) having a heat insulating property. When viewed in a thickness direction of the heat insulating plates 2, the heat insulating plates 2 and the heated body 1 may have, for example, respective circular shapes having approximately the same radius. In the above-described attached state, the porous body 3 is arranged between the heated body 1 and each of the heat insulating plates 2. The porous bodies 3 each include a large number of holes through which fluid can pass. The porous body 3 may be, for example, a plurality of wire nets superimposed on each other.

The acting mechanism 4 includes a bolt 4a and nuts 4b. The bolt 4a penetrates through the two heat insulating plates 2 and the heated body 1 such that a gap exists between the bolt 4a and each of the heat insulating plates 2 and the heated body 1. The nuts 4b are screwed onto both end portions of the bolt 4a. In the attached state, the nuts 4b are tightened on the bolt 4a in a direction of shifting the two heat insulating plates 2 to each other. Thereby, the respective porous bodies 3, the heated body 1, and the respective ceramic matrix composites 10 are held between a pair of the heat insulating plates 2. A plurality of (in the example of FIG. 2A, two) such acting mechanisms 4 may be provided.

The heat insulating member 5 covers outer peripheries of the heated body 1 and the two ceramic matrix composites 10 in the attached state. In other words, the heated body 1 and the ceramic matrix composites 10 have respective outer peripheries 1a and 10a that surround the central axis oriented in a thickness direction of the heat insulating plates 2. These outer peripheries 1a and 10a are covered with the heat insulating member 5, as illustrated in FIG. 2B. In FIG. 2A, only portions of the heat insulating member 5 are illustrated by the two-dotted chain lines. These portions are located on both sides (the left and right sides in this drawing) of the heated body 1 and the respective ceramic matrix composites 10. The heat insulating member 5 is formed of a material having a heat insulating property. For example, the heat insulating member 5 may be a heat insulating cloth (fabric) made of glass. In order to fix the heat insulating member 5 to the heated body 1, a wire 6 is wound around the heat insulating member 5 from an outside thereof in the example of FIG. 2A and FIG. 2B. However, the heat insulating member 5 may be fixed to the heated body 1 by another means.

The respective porous bodies 3 are exposed to an outer peripheral side thereof in the attached state. In other words, the porous bodies 3 each includes an outer periphery 3a surrounding the central axis oriented in the thickness direction of the heat insulating plates 2, and the outer periphery 3a is exposed to an outside in a radial direction with respect to the central axis.

Figure 2C:
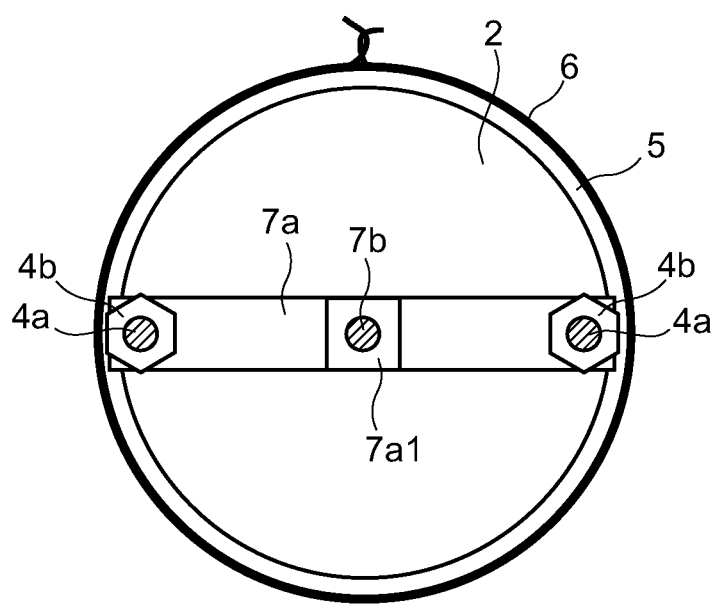
FIG. 2C is an arrow view taken along the line 2C-2C in FIG. 2A.

The suspension unit 7 is provided for suspending the ceramic matrix composite 10 and the heated body 1 at the below-described step 12. FIG. 2C is an arrow view taken along the line 2C-2C in FIG. 2A. The suspension unit 7 includes a plate-shaped member 7a and a rod-shaped member 7b. The plate-shaped member 7a is elongated, in the left-right direction in FIG. 2A and FIG. 2C, along an upper surface of the upper-side heat insulating plate 2. The bolts 4a penetrate through both end portions of the plate-shaped member 7a such that a gap exists between the plate-shaped member 7a and each of the bolts 4a. The both end portions of the plate-shaped member 7a are each sandwiched between the upper-side heat insulating plate 2 and the upper-side nut 4b. The plate-shaped member 7a is provided with a coupling portion 7a1 at a central portion of the plate-shaped member 7a. The rod-shaped member 7b is coupled to the coupling portion 7a1. The rod-shaped member 7b extends upward from the coupling portion 7a1. For example, the coupling portion 7a1 may include a protrusion as a bolt on an upper surface of the coupling portion 7a1, and a bolt hole may be formed on a lower end surface of the rod-shaped member 7b, which is not illustrated. In this case, the bolt is screwed into the bolt hole, and thereby, the coupling portion 7a1 and the rod-shaped member 7b are coupled to each other.

Figure 3:
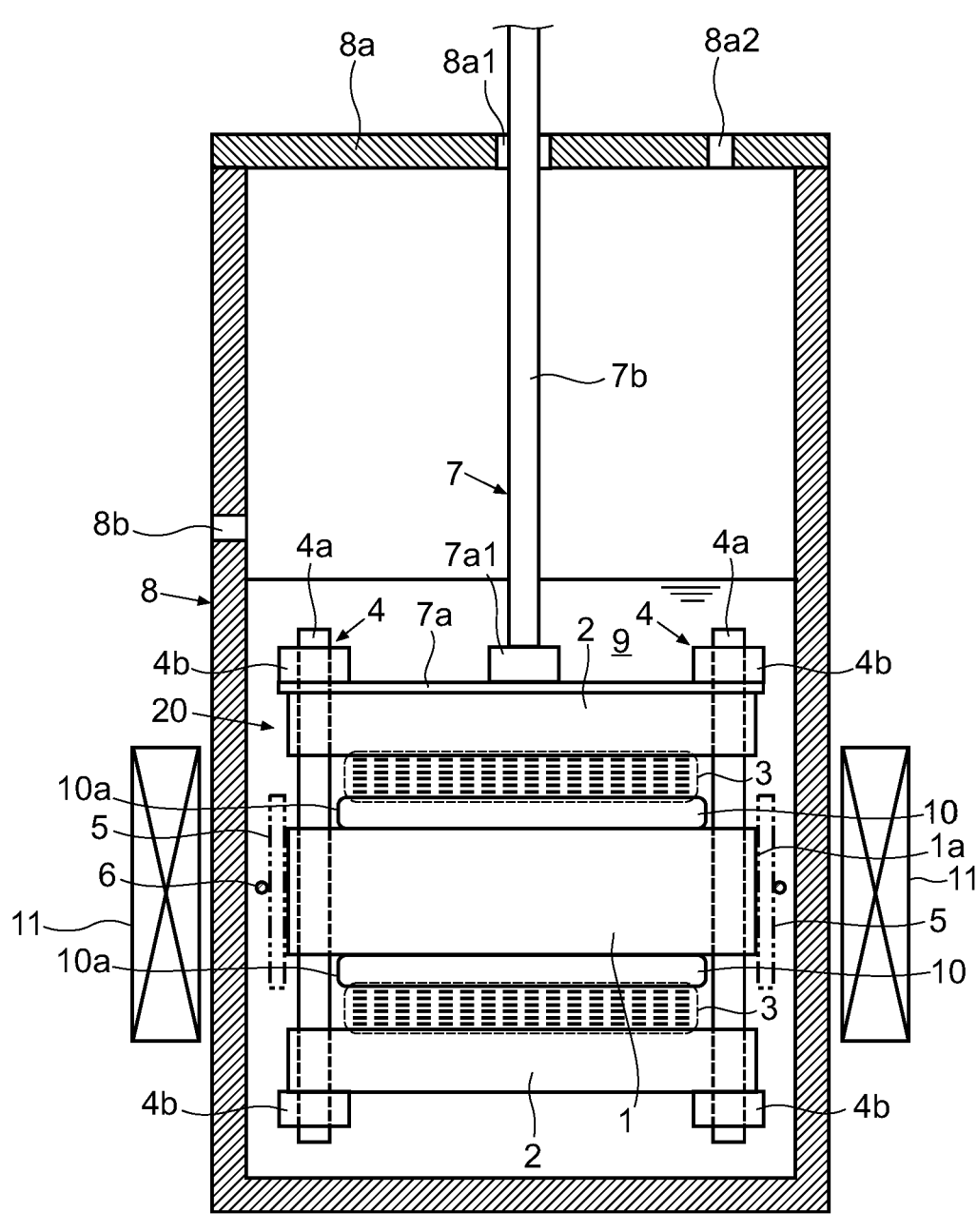
FIG. 3 illustrates a state where the ceramic matrix composites attached to the heated body by the attachment tool of FIG. 2A are arranged in a liquid material.

At the step S12, the ceramic matrix composite attached to the heated body by the attachment tool (e.g., the attachment tool 20 in FIG. 2A) is arranged in the liquid material. At this time, the ceramic matrix composites 10 are arranged in the liquid material 9 together with the attachment tool 20 and the heated body 1, as illustrated in FIG. 3. In this case, the ceramic matrix composites 10 and the heated body 1 are suspended by the suspension unit 7 such that the attachment tool 20, the heated body 1, and the ceramic matrix composites 10 do not contact with inner surfaces (a bottom surface and an inner peripheral surface) of a treatment vessel 8. At this time, the rod-shaped member 7b of the suspension unit 7 may be arranged so as to penetrate through a penetration hole 8a1 of a cover member 8a that closes an opening of an upper surface of the treatment vessel 8. An upper-end-side portion of the rod-shaped member 7b may be coupled to an unillustrated structure by an appropriate means so as to be supported by the structure.

At the step S12, the suspension unit is not limited to the configuration example illustrated in FIG. 2A, FIG. 2C, and the like as long as the suspending unit can suspend the ceramic matrix composite 10 and the heated body 1 such that the attachment tool 20, the heated body 1, and the ceramic matrix composite 10 do not contact with (i.e., are separated from) the inner surfaces of the treatment vessel 8.

The treatment vessel 8 is made of a non-electroconductive material (e.g., glass) that cannot be induction-heated. The treatment vessel 8 includes a gas introduction hole 8b formed for introducing nitrogen gas into a gas phase portion in the treatment vessel 8 at the below-described step S2. The treatment vessel 8 includes a gas discharge hole 8a2 formed for discharging gas from the gas phase portion in the treatment vessel 8 at the step S2.

By the step S12, the entire ceramic matrix composite is located within the liquid material. As a result, the liquid material enters (permeates into) the respective open pores in the matrix of the ceramic matrix composite.

An example of the liquid material may be liquid polycarbosilane (LPCS) as a liquid material for silicon carbide. However, the liquid material is not limited to this, as described below.

At the step S2, a film-boiling gas is generated from the liquid material so that the open pores (hereinafter, referred to simply as open pores) in the matrix of the ceramic matrix composite are charged with precipitates as ceramic from the film-boiling gas. The step S2 includes steps S21 and S22.

At the step S21, the ceramic matrix composite located in the liquid material is heated until a temperature of the ceramic matrix composite becomes a target temperature that is equal to or higher than a boiling point of the liquid material. Thereby, ceramic derived from the liquid material is generated in the open pores. In other words, the liquid material is heated by the heated ceramic matrix composite, and thereby turns into a film-boiling gas (i.e., is brought into a film-boiling state) at an interface between the liquid material and the matrix (inner surfaces of the open pores) of the ceramic matrix composite. The ceramic (i.e., thermally decomposed precipitates as the ceramic) is generated from the thus-generated film-boiling gas so as to be deposited in the open pores. This ceramic may result from one or both of the following events (i) and (ii).

(i) The film-boiling gas collides with the inner surfaces of the open pores, and thus, further receives thermal energy. Thereby, the film-boiling gas proceeds to be thermally decomposed and become inorganic, resulting in the solid ceramic precipitated on the inner surfaces of the open pores.

(ii) A gas included in a part of the film-boiling gas has already been thermally decomposed. This thermally decomposed gas collides with the heated inner surfaces of the open pores, and thereby proceeds to become inorganic, resulting in the solid ceramic precipitated on the inner surfaces of the open pores.

At the step S21, the ceramic may be precipitated also on an interface between the ceramic matrix composite and the liquid material, at locations other than the inner surfaces of the open pores of the matrix.

At the step S21, the ceramic matrix composite may be heated by induction-heating the heated body. For example, as illustrated in FIG. 3, alternating current is caused to flow through a coil 11, and thus, the coil 11 generates an alternating magnetic field. The alternating magnetic field causes the heated body 1 to be induction-heated. The heated body 1 is thus heated to generate heat that heats the ceramic matrix composite and the liquid material. A temperature rising rate of the heated body (or the ceramic matrix composite) at the step S21 is desirably equal to or lower than 3000° C./hour, equal to or lower than 2000° C./hour, or equal to or lower than 1500° C./hour, in order to charge the fine open pores with the ceramic. In this case, the temperature rising rate may be equal to or higher than 500° C./hour. In this case, more desirably, the temperature rising rate is approximately 1000° C./hour, or equal to or lower than 1000° C./hour. However, the temperature rising rate is not limited to this. For example, the temperature rising rate may be lower than 500° C./hour (in this case, the temperature rising rate may be, for example, equal to or higher than 100° C./hour).

When a temperature of the ceramic matrix composite reaches the target temperature equal to or higher than the boiling point of the liquid material at the step S21, the sequence proceeds to the step S22. For example, a temperature sensor is attached to the ceramic matrix composite or a surface of the heated body. The attached temperature sensor measures a temperature as a temperature of the ceramic matrix composite. When the measured temperature reaches the target temperature, the sequence may proceed to the step S22. The target temperature may be used as an approximate indication. In other words, it can be difficult to start the step S22 at a timing when a temperature of the ceramic matrix composite reaches the target temperature. For this reason, a timing of starting the step S22 may be a timing when a temperature of the ceramic matrix composite reaches the target temperature, or may be a timing when a temperature of the ceramic matrix composite exceeds the target temperature to some extent.

At the step S22, the ceramic matrix composite is cooled until a temperature of the ceramic matrix composite becomes another target temperature lower than the boiling point of the liquid material. Thereby, the step S22 stops the film-boiling phenomenon of the liquid material at the interface between the matrix (the inner surfaces of the respective open pores) and the liquid material (on the contrary, Patent Literature 2 and Non-Patent Literature 3 do not describe that a film-boiling phenomenon is stopped). As a result, in a state where a new film-boiling gas is not generated, the already generated film-boiling gas is replaced with the liquid material. Thereby, the liquid material once more enters (permeates into) each open pore of which entirety has not been filled with the ceramic. For example, at the step S22, the liquid material once more enters each open pore of which only part has been filled with the ceramic at the step S21. A temperature lowering rate of the heated body (or the ceramic matrix composite) at the step S22 is desirably equal to or lower than 3000° C./hour, and is more desirably 1000° C./hour, but is not limited to this.

The cooling at the step S22 may be caused as a result of stopping the heating of the ceramic matrix composite and maintaining this stopped state. Alternatively, at the step S22, the liquid material may be positively cooled in addition to stopping the heating of the ceramic matrix composite. For example, in FIG. 3, a part of the liquid material 9 in the treatment vessel 8 may be caused to flow to an outside of the treatment vessel 8, and may be cooled by a heat exchanger.

Then, the cooled liquid material 9 may be returned to an inside of the treatment vessel 8. In this manner, the cooled liquid material 9 may be circulated. In this case, piping, a pump, and the like (not illustrated) may be provided for circulating the liquid material 9 in such a manner.

When a temperature of the ceramic matrix composite at the step S22 becomes the target temperature lower than the boiling point of the liquid material by cooling the ceramic matrix composite, the step S21 is restarted. For example, a temperature measured by the above-described temperature sensor is regarded as a temperature of the ceramic matrix composite, and when the measured temperature becomes equal to or lower than the target temperature, the step S21 is restarted. This target temperature may be used as an approximate indication. In other words, it can be difficult to restart the step S21 at a timing when a temperature of the ceramic matrix composite reaches the target temperature. For this reason, a timing of restarting the step S21 may be a timing when a temperature of the ceramic matrix composite reaches the target temperature, or may be a timing when a temperature of the ceramic matrix composite declines from the target temperature to some extent.

After the step S22, before the restart of the step S21, it is confirmed that bubbles are not generated, from the ceramic matrix composite, in the liquid material in the treatment vessel 8. After this confirmation is made, the step S21 is restarted. This confirmation may be made, for example, by visually recognizing, from an outside, an inside of the transparent treatment vessel 8 made of glass. It can be determined from no generated bubbles that the liquid material has completely permeated into an inside of the ceramic matrix composite.

The step S21 is restarted in such a manner, and the step S21 and the step S22 are repeated. Thereby, the ceramic grows in each open pore in the matrix. Thus, these pores are charged with the ceramic. The step S21 and the step S22 are repeated until each open pore is sufficiently charged with the ceramic (e.g., each open pore is completely filled with the ceramic). The number of times of this repetition may be, for example, equal to or larger than 10 and equal to or lower than 20, but is not limited to this range.

When the liquid material is LPCS described above, the above-described ceramic is silicon carbide. In this case, the boiling point of LPCS rises from approximately 180° C. to approximately 250° C. as polymerization thereof progresses in the course of the repetition of the step S21 and the step S22. In this case, the maximum reached temperature of the ceramic matrix composite at the step S21 is equal to or higher than 800° C. for example, and is preferably equal to or higher than 1000° C. and equal to or lower than 1400° C. When the maximum temperature is equal to or higher than 1000° C., sufficient progress of conversion into the inorganic ceramic can be expected. When the maximum temperature is equal to or lower than 1400° C., it is possible to prevent a speed of precipitation of the ceramic from becoming too high, and prevent occurrence of severe thermal decomposition that results in undeposition of the ceramic. Thus, it can be expected to facilitate the charging of the fine open pores with the ceramic.

When the liquid material is LPCS described above, the lowest reached temperature of the ceramic matrix composite at the step S22 is a temperature lower than the boiling point of LPCS. The boiling point of LPCS rises from approximately 180° C. to approximately 250° C. as described above in the course of the repetition of the step S21 and the step S22. Accordingly, at the step S22 of each time, the ceramic matrix composite is cooled until a temperature of the ceramic matrix composite becomes lower than the boiling point that rises in such a manner. Thereby, the liquid material stops boiling. Thus, the liquid material in a liquid state permeates into the respective open pores in the ceramic matrix composite.

Advantageous Effects of First Embodiment

The method for charging open pore according to the present embodiment can achieve the following effects (A) to (G).

(A) The ceramic matrix composite is arranged in the liquid material so that the liquid material enters (permeates into) the open pores in the matrix. Next, the ceramic matrix composite is heated until a temperature of the ceramic matrix composite becomes equal to or higher than the boiling point of the liquid material. Thereby, the liquid material in the open pores of the matrix turns into a film-boiling gas. The ceramic is formed from this film-boiling gas so as to partially fill the open pores. Then, the ceramic matrix composite is cooled until a temperature of the ceramic matrix composite becomes a temperature lower than the boiling point. Thereby, the boiling of the liquid material in the open pores is stopped so that the liquid material enters (permeates into) the open pores again. Next, the ceramic matrix composite is heated until a temperature of the ceramic matrix composite becomes equal to or higher than the boiling point of the liquid material. Such heating and cooling is repeated so that the respective open pores in the matrix can be charged with the ceramic.

(B) Thereby, it is possible to block the open pores that can be routes through which oxygen and combustion gas enter an inside of the ceramic matrix composite. Further, it is possible to reduce the number of tips of the open pores that can be points from which cracks start to develop. Thus, oxidation resistance, strength, and a fatigue property of the ceramic matrix composite are improved.

(C) In the method for charging the open pores according to the present embodiment, the ceramic matrix composite is cooled until a temperature of the ceramic matrix composite becomes a temperature lower than the boiling point of the liquid material in each time of the repeated cooling treatment (the above-described step S22). Thereby, the liquid material can be caused to enter the open pores in the matrix as described above. For this reason, the liquid material can be caused to enter even the fine open pores each having a size equal to or smaller than several micrometers (e.g., the open pores having a width equal to or smaller than a value within a range from 1 μm to 2 μm) so that in these open pores, the ceramic can be generated from the film-boiling gas of the liquid material. Thus, even the fine open pores can be charged with the ceramic.

(D) The above-described heating and cooling takes less time. Accordingly, repeating the above-described heating and cooling makes it possible to charge (e.g., completely fill), with the ceramic, the relatively large open pores and the fine open pores having a size equal to or smaller than several micrometers, in a short time (e.g., several hours). For example, one cycle of performing the step S21 and the step S22 once takes approximately 30 minutes to 1 hour. It is expected that the one cycle causes the ceramic to grow in each open pore by a size of 5 μm to 10 μm at most. The heating is performed by induction-heating the heated body contacting with the ceramic matrix composite. For this reason, the ceramic matrix composite can be heated rapidly.

(E) When a plurality of (two in FIG. 2A) ceramic matrix composites are attached to the heated body, the method for charging the open pores can be performed simultaneously for a plurality of the ceramic matrix composites.

(F) Heat radiation from the heated body 1 and the ceramic matrix composite 10 can be suppressed by the respective heat insulating plates 2 and the heat insulating member 5 in the attachment tool 20 in FIG. 2A.

(G) When the heated body 1 is induction-heated at the above-described step S21, the treatment vessel 8 formed of the non-electroconductive material is not induction-heated. At this time, as illustrated in FIG. 3, the suspension unit 7 suspends the heated body 1, the ceramic matrix composite 10, and the attachment tool 20 so as not to contact with the inner surfaces of the treatment vessel 8. Thus, the treatment vessel 8 is prevented from being broken by contacting with the heated body 1, the ceramic matrix composite 10, and the attachment tool 20 that are at a high temperature.

(H) In the above-described method for charging the open pores, the heated body 1 may be omitted. In this case, the fiber body (e.g., carbon fibers or silicon carbide fibers) constituting the ceramic matrix composite and having a sufficiently large heat capacity (volume) may be induction-heated at the step S21. Thereby, the above-described film-boiling gas may be generated so that one or both of the above-described events (i) and (ii) cause the ceramic to be deposited in the open pores of the matrix of the ceramic matrix composite. In this case, for example in FIG. 2A and FIG. 3, the heated body 1 may be omitted, the number of ceramic matrix composites 10 may be changed to one, the one ceramic matrix composite 10 may contact with the porous bodies 3 on upper and lower sides thereof, the heat insulating member 5 may cover the outer periphery 10a of the ceramic matrix composite 10, and the other matters may be the same as those described above. In addition to or instead of omitting the heated body 1, the heat insulating plates 2 may be omitted.

Second Embodiment

The following describes a method for charging open pores in a ceramic matrix composite according to a second embodiment of the present invention. Concerning the second embodiment, the matters that are not described below may be the same as those in the first embodiment.

In the second embodiment, the ceramic matrix composite as a target of the method for charging open pores is one that has been produced by forming a matrix on a large number of reinforcing fibers (e.g., the above-described fiber body) by the film boiling (FB). In the film boiling, the respective reinforcing fibers (fiber body) are heated in a state where a large number of these reinforcing fibers (fiber body) is arranged in a liquid material for the matrix. By this heating, the ceramic derived from the liquid material is deposited as the matrix on the respective reinforcing fibers. In this manner, the matrix is formed. In other words, the liquid material is heated by the heated reinforcing fibers, and thereby turns into a film-boiling gas. The ceramic is generated from this film-boiling gas so as to be deposited on the reinforcing fibers. This ceramic may result from one or both of the following events (1) and (2).

(1) The film-boiling gas collides with the heated reinforcing fibers, and thus, further receives thermal energy. Thereby, the film-boiling gas proceeds to be thermally decomposed and become inorganic, resulting in the solid ceramic precipitated on the reinforcing fibers.

(2) A gas included in a part of the film-boiling gas has already been thermally decomposed. This thermally decomposed gas collides with the heated reinforcing fibers, and thereby proceeds to become inorganic, resulting in the solid ceramic precipitated on the reinforcing fibers.

Such a film boiling (FB) enables the method for charging open pores according to the second embodiment to be performed while the ceramic matrix composite including the matrix therein remains arranged in the above-described liquid material. In other words, before the above-described step S2 is performed, the matrix is formed on the fiber body arranged in the liquid material, by the film boiling method. Thereby, the ceramic matrix composite is formed in the liquid material, which results in a state where the ceramic matrix composite is arranged in the liquid material. Thus, such matrix forming treatment by the film boiling is a substitute for the above-described step S1.

Figure 4:
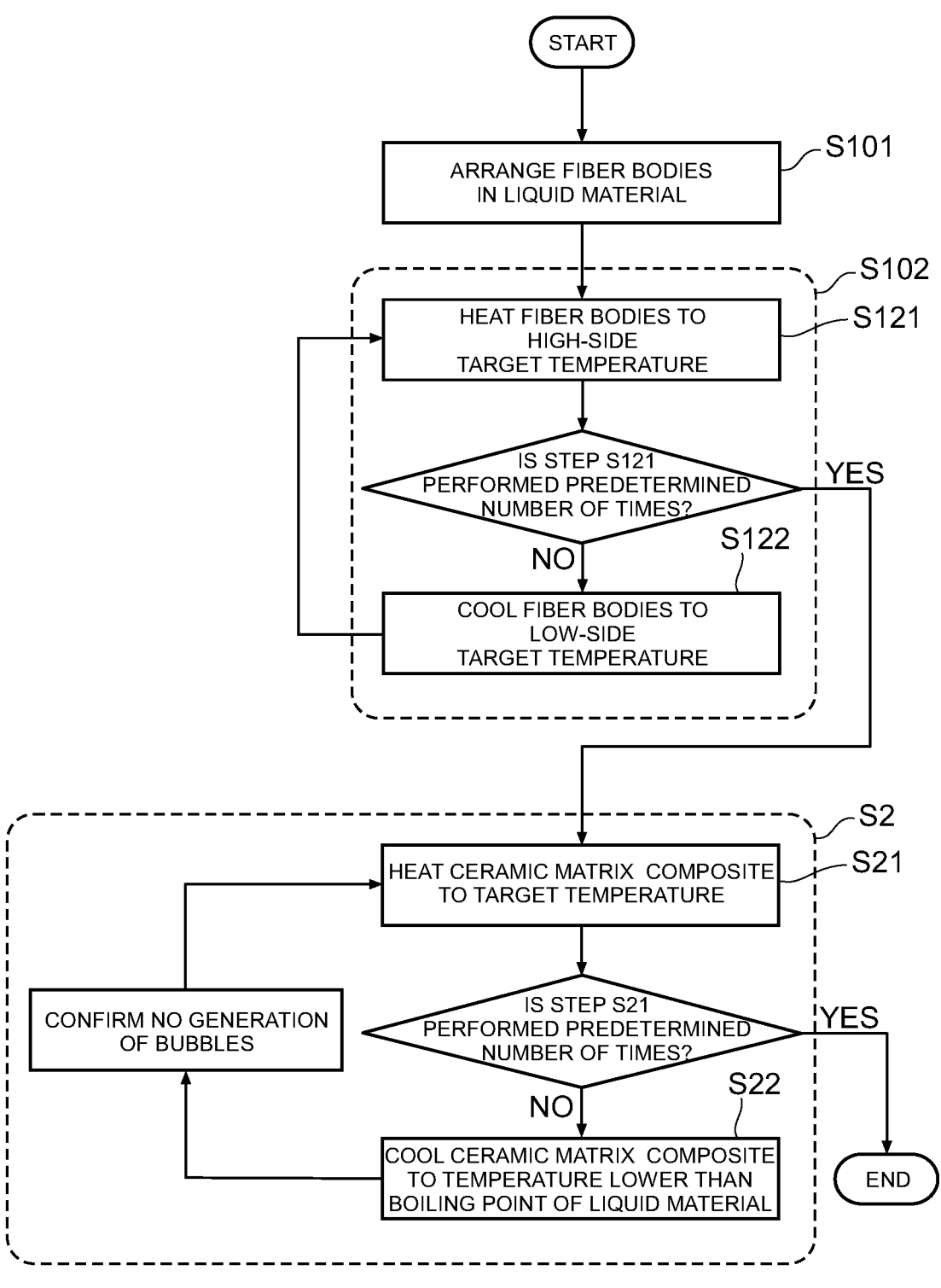
FIG. 4 is a flowchart representing a method for charging open pores in a ceramic matrix composite according to a second embodiment of the present invention.

FIG. 4 is a flowchart in the case where the method for producing a ceramic matrix composite and the method for charging open pores are performed sequentially in this order in the second embodiment.

At the step S101, a fiber body formed of reinforcing fibers is attached to a heated body by an attachment tool, and is arranged together with the heated body in a liquid material. In this state, the fiber body may contact with the heated body, but does not need to contact with the heated body. The liquid material is a liquid serving as a material for a matrix. Using LPCS described above as the liquid material forms the matrix mainly of silicon carbide.

Figure 5:
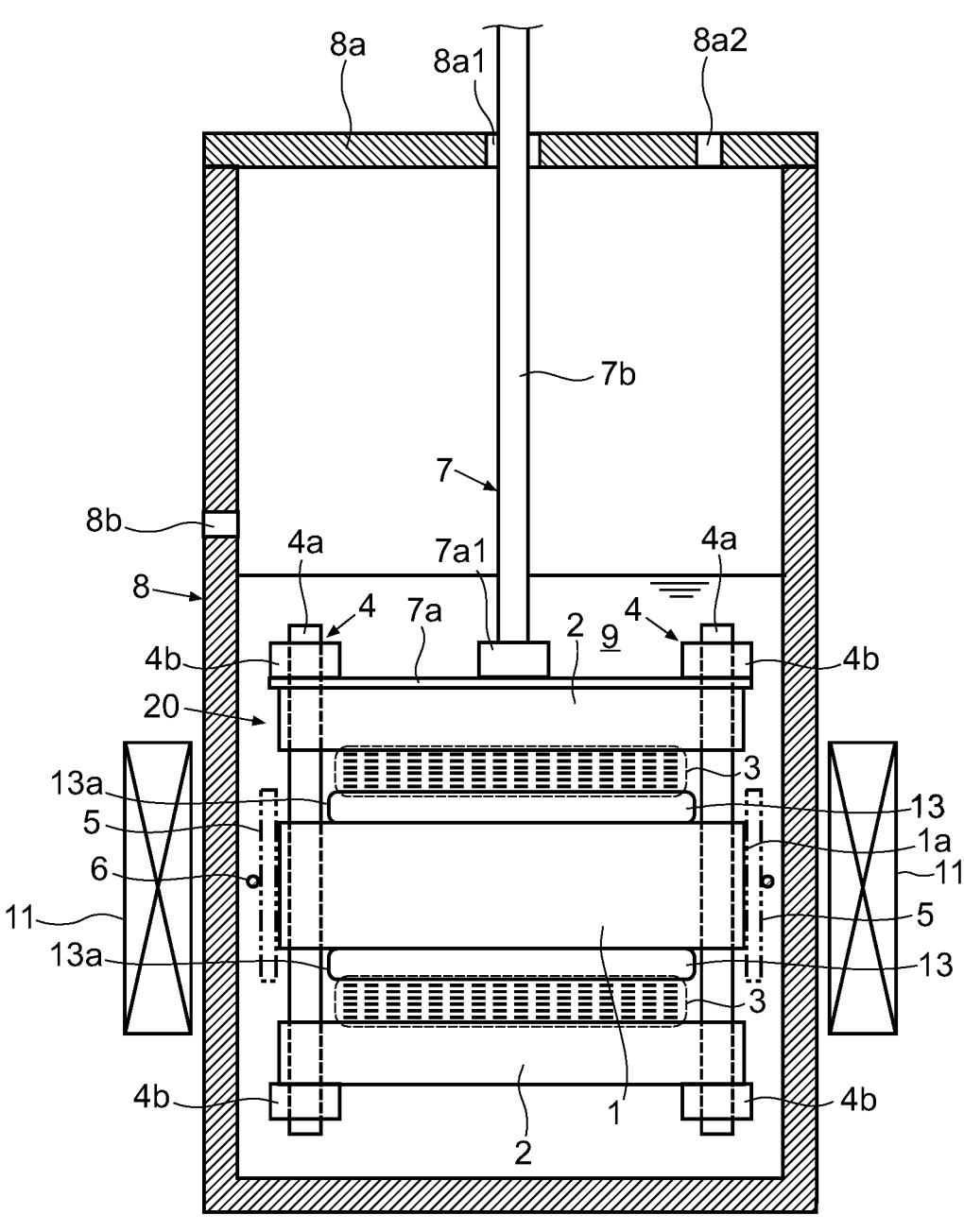
FIG. 5 illustrates a state where fiber bodies attached to a heated body by the attachment tool of FIG. 2A are arranged in a liquid material.

The attachment tool used at the step S101 may be the same as the attachment tool in FIG. 2A. In this case, a state immediately after the step S101 is performed is the same as a state where in FIG. 2A, each of the ceramic matrix composites 10 is replaced with the fiber body. In other words, instead of the ceramic matrix composites, the fiber bodies are attached to the heated body by the attachment tool at the step S101. FIG. 5 illustrates a state where such fiber bodies attached to the heated body are arranged in the liquid material at the step S101. In FIG. 5, the reference sign 13 denotes the fiber body, and the reference sign 13a denotes an outer periphery of the fiber body 13.

As illustrated in FIG. 5, in a state where the fiber bodies 13 are arranged in the liquid material 9, the fiber bodies 13 and the heated body 1 are suspended by the suspension unit 7 such that the attachment tool 20, the heated body 1, and the fiber bodies 13 do not contact with inner surfaces (bottom surface and inner peripheral surface) of the treatment vessel 8. In this state, an upper-end-side portion of the rod-shaped member 7b may be coupled to an unillustrated structure by an appropriate means so as to be supported by the structure, similarly to the above-described case. This state is maintained until the step S2 is ended.

At the step S102, ceramic matrix composites are produced by forming matrices on the fiber bodies by the film boiling as described above. The step S102 includes steps S121 and S122.

At the step S121, the reinforcing fibers (fiber bodies) are heated until a temperature of the reinforcing fibers becomes equal to or higher than a high-side target temperature. The high-side target temperature is higher than a temperature at which the ceramic starts to be generated on each of the reinforcing fibers of the fiber body by the above-described film-boiling gas.

The heating at the step S121 may be performed by induction-heating the heated body. For example, as illustrated in FIG. 5, alternating current is caused to flow through the coil 11 so that the coil 11 generates an alternating magnetic field, and the generated alternating magnetic field induction-heats the heated body 1. The fiber bodies and the liquid material are heated by heat generated by the heated body that is thus induction-heated. When a temperature of the fiber body (reinforcing fibers) becomes equal to or higher than the high-side target temperature at the step S121, the sequence proceeds to the step S122. For example, when a temperature measured by a temperature sensor attached to a surface of the heated body becomes equal to or higher than the high-side target temperature, the sequence proceeds to the step S122. For example, a temperature rising rate of the fiber body (or the heated body) at the S121 is desirably equal to or lower than 3000° C./hour, equal to or lower than 2000° C./hour, or equal to or lower than 1500° C./hour. In this case, this temperature rising rate may be equal to or higher than 1000° C./hour (or may be higher than 1000° C./hour).

At the step S122, the fiber body is cooled. In other words, at the step S122, the heating of the fiber body is stopped, and the state in which the fiber body is not heated is maintained until a temperature of the fiber body (or the heated body) becomes equal to or lower than a low-side target temperature. The low-side target temperature is equal to or lower than a temperature at which formation of the ceramic on each reinforcing fiber by the above-described film-boiling gas is stopped. This target temperature may be equal to or higher than a boiling point of the liquid material. At the step 122, the liquid material may be cooled by a heat exchanger as described above, in addition to stopping the heating of the reinforcing fibers.

When the liquid material is LPCS described above, the high-side target temperature at the step S121 is desirably in a range equal to or higher than 800° C. and equal to or lower than 1600° C., and the low-side target temperature at the step S122 is desirably lower than 800° C., more preferably equal to or lower than 500° C. (e.g., is 500° C.), and may be a value within a range from 300° C. to 400° C., for example. These target temperatures may be used as approximate indications as described above.

When a temperature of the fiber body (or the heated body) becomes equal to or lower than the low-side target temperature (e.g., when a temperature measured by the temperature sensor attached to the surface of the heated body becomes equal to or lower than the low-side target temperature) at the step S122, the step S121 is restarted. In this manner, the step S121 and the step S122 are repeated. In this repetition, the sequence may proceed from the step S121 to the step S122 while the boiling state of the liquid material is maintained. Performing the step S121 and the step S122 once causes one layer of the matrix to be formed, for each reinforcing fiber, of the ceramic that is generated, for each reinforcing fiber, from the above-described film-boiling gas by thermal decomposition. Assuming that performing the step S121 and the step S122 once is one cycle, the number of the layers formed for each reinforcing fiber becomes the same as the number of the cycles.

Repeating the step S121 and the step S122 causes the ceramic to be sequentially deposited around each reinforcing fiber so that the ceramic matrix is formed. Thus, the formation of the matrix is completed. This matrix has a layer structure in which a plurality of the layers are sequentially superimposed one after another (around each reinforcing fiber). In this case, a temperature rising rate of the fiber body (or the heated body) at the step S121 is slow enough to form the matrix having the layer structure. For example, the temperature rising rate is desirably equal to or lower than 3000° C./hour, equal to or lower than 2000° C./hour, or equal to or smaller than 1500° C./hour. In this case, the temperature rising rate may be equal to or higher than 1000° C./hour, or may be higher than 1000° C./hour.

In other words from another standpoint, the fiber body is preferably heated over an appropriate time in order to form the matrix having the layer structure. For example, at the step S121 of the one time, a time during which a temperature of the fiber body is raised (i.e., a total time during which a temperature of the fiber body is raised) may be longer than 10 minutes, equal to or longer than 15 minutes, equal to or longer than 20 minutes, or equal to or longer than 30 minutes. In this case, the time during which a temperature of the fiber body is raised may be, for example, equal to or shorter than 40 minutes, equal to or shorter than 50 minutes, or equal to or shorter than 60 minutes, but is not limited these, and may be longer than 60 minutes.

However, according to the present invention, the step S122 may be omitted. In this case, at the step S121, the fiber body in the liquid material may be continued to be heated, for a predetermined time, at a temperature equal to or higher than 1000° C. and equal to or lower than 1400° C., for example, so that formation of the matrix is completed. In this case, the matrix that does not have a layer structure is formed.

Repeating the step S121 and the step S122, or performing the step S102 with the step S122 being omitted completes the formation of the matrix. Thereby, the ceramic matrix composite (the two ceramic matrix composites in FIG. 5) can be produced.

In the second embodiment, once the formation of the matrix is completed as described above, the method for charging open pores is started without taking out the ceramic matrix composite from the liquid material (e.g., the liquid material 9 in FIG. 5) used at the step S102. In other words, the above-described step S2 (step S21) is started without performing the step S1 in the method for charging open pores.

When the formation of the matrix is completed by use of the attachment tool 20 in FIG. 5, each of the fiber bodies 13 in FIG. 5 becomes the ceramic matrix composite, which results in a state of FIG. 3. Accordingly, the step S2 (step S21) is started without performing the step S1. In other words, the treatment of the method for charging open pores is started.

The subsequent steps in the method for charging open pores are the same as those in the first embodiment, and thus, description thereof is omitted. The heated body, the attachment tool, the coil, the treatment vessel, the liquid material in the treatment vessel, and the like used in the above-described method for producing the ceramic matrix composite are continued to be used also in the subsequent method (step S2) for charging open pores. The above-described target temperature at the step S22 in the method for charging open pores is lower than the above-described low-side target temperature at the step S122.

Advantageous Effects of Second Embodiment

In the second embodiment, the treatment of the method for charging open pores can be started without performing the step S1 in the first embodiment, after the ceramic matrix composite is produced by forming the matrix on the fiber body by the film boiling.

Embodied Examples

In an embodied example of the second embodiment, the fiber body at the step S101 is formed of silicon carbide fibers as reinforcing fibers, and the liquid material is LPCS described above. The above-described steps represented in the flowchart of FIG. 4 were performed using the configuration illustrated in FIG. 5.

Figure 6:
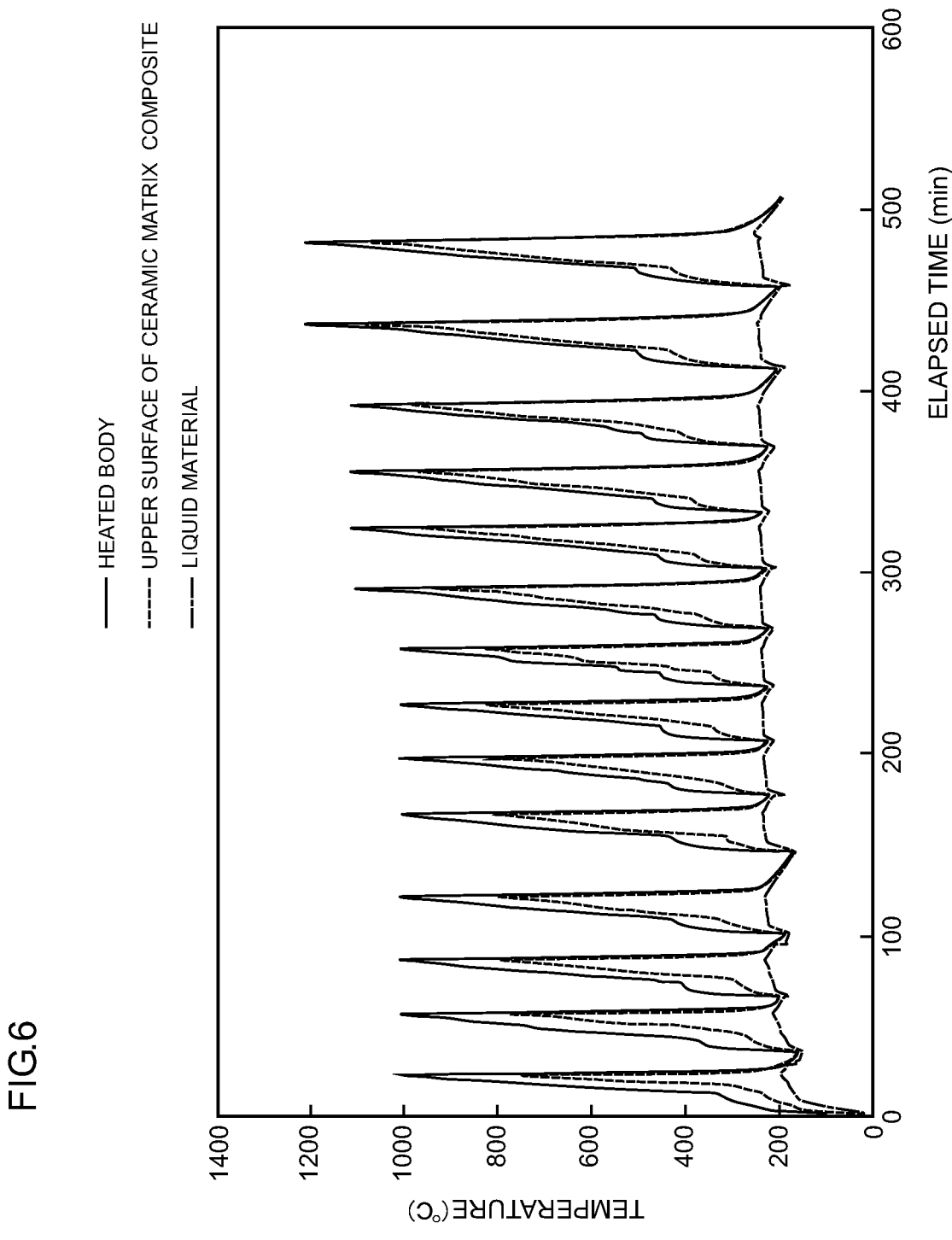
FIG. 6 is a graph representing a temperature change in the method for charging open pores according to an embodied example.

FIG. 6 is a graph representing an example of a temperature change at the above-described step S2 in the embodied example. In FIG. 6, the solid line indicates a surface temperature of the heated body, the dashed line indicates a temperature of an upper surface of the ceramic matrix composite 10 on an upper side in FIG. 4, and the one-dotted chain line indicates a temperature of the liquid material in FIG. 4.

Figure 7:
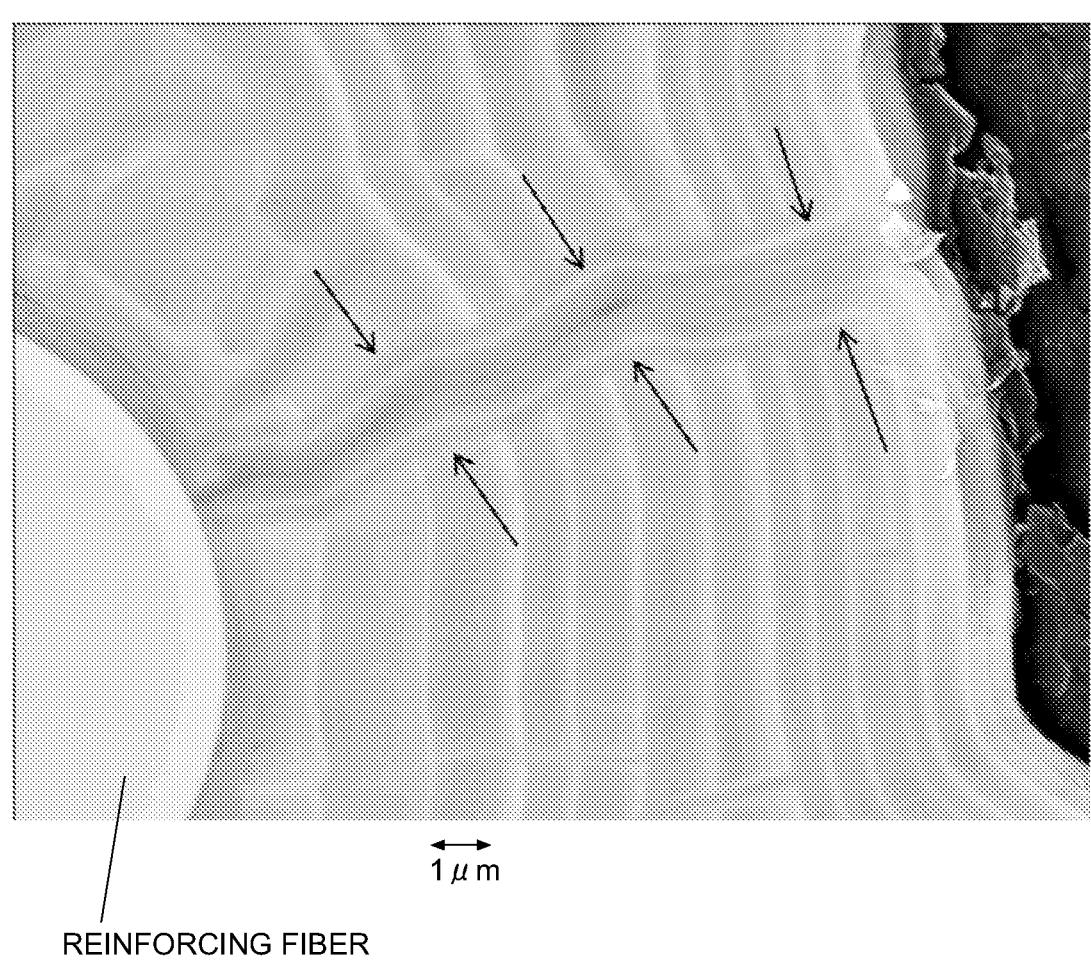
FIG. 7 is an image acquired by a scanning electron microscope and representing a ceramic matrix composite in which an open pore has been charged with ceramic by an embodied example.

FIG. 7 is an image of the ceramic matrix composite in which an open pore has been charged with ceramic by another embodied example. The image was acquired by a scanning electron microscope. FIG. 7 represents a state resulting from the step S2 performed for 2.5 hours with a temperature change as represented in FIG. 6. In FIG. 7, a portion indicated by the arrows and sandwiched between these arrows is an open pore as a crack. This crack has a width of approximately 1 μm to 2 μm, and elongates from a position of the reinforcing fiber. The step S2 for 2.5 hours enabled this crack to be charged with the ceramic.

Third Embodiment

The following describes a method for charging open pores in a ceramic matrix composite according to a third embodiment of the present invention. In the third embodiment, the matters except for the below-described matters may be the same as those in the first embodiment.

The liquid material (the liquid material used at the step S1) for generating the above-described ceramic in the open pores may be a liquid material other than LPCS described above. For example, the liquid material may be borazine, methyltrichlorosilane, cyclohexane, a silicon alkoxide solution, an aluminum alkoxide solution, a mixture of a silicon alkoxide solution and an aluminum alkoxide solution, or a zirconium alkoxide solution.

When the liquid material used at the step S1 is borazine, the ceramic formed by the heating at the step S21 is boron nitride (BN) that is ceramic. Boron nitride has low adhesion to silicon carbide. Thus, when the matrix is mainly made of silicon carbide, boron nitride charged in the open pores has a function of suppressing crack propagation at the interface with the matrix.

When the liquid material used at the step S1 is methyltrichlorosilane, the ceramic formed by the heating at the step S21 is silicon carbide (SiC) that is ceramic, as in the case where the liquid material is liquid polycarbosilane (LPCS).

When the liquid material used at the step S1 is cyclohexane, the ceramic formed by the heating at the step S21 is carbon. This carbon has a function of suppressing crack propagation, similarly to the case of boron nitride described above.

When the liquid material used at the step S1 is the silicon alkoxide solution, the ceramic formed by the heating at the step S21 is silicon dioxide ($SiO_2$). The silicon alkoxide solution is cheaper than LPCS.

When the liquid material used at the step S1 is the aluminum alkoxide solution, the ceramic formed by the heating at the step S21 is alumina ($Al_2O_3$). The aluminum alkoxide solution is cheaper than LPCS.

When the liquid material used at the step S1 is the mixture of the silicon alkoxide solution and the aluminum alkoxide solution, the ceramic formed by the heating at the step S21 is mullite ($Al_2O_3$—$SiO_2$).

When the liquid material used at the step S1 is the zirconium alkoxide solution, the ceramic formed by the heating at the step S21 is zirconia ($ZrO_2$). Zirconia is ceramic having a melting point higher than silicon carbide, and thus functions as a part of the matrix without melting even in an environment of an ultra-high temperature.

According to the present invention, the liquid material used at the step S1 is not limited to the above-described specific examples, and may be any of other liquid materials. For example, any of other metal alkoxide solutions may be the liquid material used at the step S1. In this case, the ceramic formed by the heating at the step S21 may be oxide ceramic. In this case, the liquid material used at the step S1 may be, for example, a mixture of three alkoxide solutions (alkoxydes) such as one described in Non-Patent Literature 1, such that the ceramic generated in the open pores at the step S21 is barium aluminosilicate ($BaAl_2S1_2O_8$).

The present invention is not limited to the above-described embodiments, and of course, various modifications can be made within the scope of the technical idea of the present invention. For example, the following modified example may be adopted. In this case, the matters that are not described below may be the same as those described above.

Modified Example

The liquid material used in the second embodiment may be a liquid material other than LPCS. In this case, the liquid material usable in the above-described film boiling may be an inorganic polymer material that is a material including an alkoxide solution and serving as a material for ceramic and that has such a low molecular weight as to be in a liquid state.

For example, the liquid material used in the above-described film boiling may be a mixture of three alkoxide solutions (alkoxydes) such as one described in Non-Patent Literature 1. In this case, the matrix may be formed of barium aluminosilicate ($BaAl_2S1_2O_8$).

In another example, the liquid material used in the above-described film boiling may be a mixture of a plurality of alkoxide solutions (alkoxydes) such as one described Non-Patent Literature 2. In this case, the matrix may be formed of mullite.

The liquid material used in the second embodiment may be any of the liquid materials described in the third embodiment.

REFERENCE SIGNS LIST

1: heated body, 1a: outer periphery, 2: heat insulating plate, 3: porous body, 3a: outer periphery, 4: acting mechanism, 4a: bolt, 4b: nut, 5: heat insulating member, 6: wire, 7: suspension unit, 7a: plate-shaped member, 7a1: coupling portion, 7b: rod-shaped member, 8: treatment vessel, 8a: cover member, 8a1: penetration hole, 8a2: gas discharge hole, 8b: gas introduction hole, 9: liquid material, 10: ceramic matrix composite, 10a: outer periphery, 11: coil, 13: fiber body, 20: attachment tool

The invention claimed is:

1. A method for charging open pores in a ceramic matrix composite including a matrix and reinforcing fibers provided in the matrix, the method being for charging, with ceramic derived from a liquid material, the open pores formed in the matrix of the ceramic matrix composite, so that the ceramic comes to constitute the matrix, wherein the method comprises:

a step (A) of, in an arranged state where the ceramic matrix composite is arranged in the liquid material serving as a matrix material, heating the ceramic matrix composite, thereby bringing the liquid material into a film-boiling state such that the ceramic derived from the liquid material is generated in the open pores;

a step (B) of, in the arranged state, cooling the ceramic matrix composite; and repeating the step (A) and the step (B) in the arranged state, thereby charging the open pores with the ceramic, wherein the repeating the step (A) and the step (B) includes:

raising the temperature of the ceramic matrix composite by heating the ceramic matrix composite at the step (A);

starting the step (B) at a timing that the temperature of the ceramic matrix composite becomes equal to or higher than a high-side target temperature in course of raising the temperature of the ceramic matrix composite at the step (A);

lowering the temperature of the ceramic matrix composite by cooling the ceramic matrix composite at the step (B); and starting the step (A) again at a timing that the temperature of the ceramic matrix composite becomes equal to or lower than a low-side target temperature in course of lowering the temperature of the ceramic matrix composite at the step (B), wherein the low-side target temperature is lower than a boiling point of the liquid material.

2. The method for charging the open pores in the ceramic matrix composite according to claim 1, comprising:

arranging the produced ceramic matrix composite in the liquid material before the step (A).

3. The method for charging the open pores in the ceramic matrix composite according to claim 1, comprising:

before the step (A), by film boiling, forming the matrix on a fiber body arranged in the liquid material, and thereby forming the ceramic matrix composite in the liquid material; and while letting the ceramic matrix composite remain arranged in the liquid material, then starting the step (A).

4. The method for charging the open pores in the ceramic matrix composite according to claim 1, wherein in the arranged state, the ceramic matrix composite and a heated body are arranged inside a treatment vessel that holds the liquid material, and the step (A) includes induction-heating the heated body, thereby heating the ceramic matrix composite.

5. The method for charging the open pores in the ceramic matrix composite according to claim 4, wherein the step (A) includes causing alternating current to flow through a coil arranged outside the treatment vessel, the coil thereby generating an alternating magnetic field so that the heated body is induction-heated by the alternating magnetic field and thereby heats the ceramic matrix composite, and the treatment vessel is formed of a non-electroconductive material.

6. The method for charging the open pores in the ceramic matrix composite according to claim 4, comprising:

performing the step (A) with the ceramic matrix composite being attached to the heated body by an attachment tool, with the attachment tool, the ceramic matrix composite, and the heated body being suspended so as not to contact with inner surfaces of the treatment vessel.

7. The method for charging the open pores in the ceramic matrix composite according to claim 1, wherein the liquid material is polycarbosilane, borazine, methyltrichlorosilane, cyclohexane, a silicon alkoxide solution, an aluminum alkoxide solution, a mixture of a silicon alkoxide solution and an aluminum alkoxide solution, or a zirconium alkoxide solution.

\* \* \* \* \*